(12) United States Patent
Roberge et al.

(10) Patent No.: US 12,171,167 B2
(45) Date of Patent: Dec. 24, 2024

(54) SEWING SYSTEM TO SECURE WRAP MATERIAL FOR AGRICULTURAL BALING SYSTEM

(71) Applicant: CNH Industrial America LLC, New Holland, PA (US)

(72) Inventors: Martin J. Roberge, Saskatoon (CA); Jonathan E. Ricketts, Davenport, IL (US); Zachary Harmon, East Earl, PA (US); Dan L. Garland, Solon, IA (US)

(73) Assignee: CNH Industrial America LLC, Holland, PA (US)

( * ) Notice: Subject to any disclaimer, the term of this patent is extended or adjusted under 35 U.S.C. 154(b) by 255 days.

(21) Appl. No.: 17/627,365

(22) PCT Filed: Jul. 16, 2020

(86) PCT No.: PCT/US2020/042327
§ 371 (c)(1),
(2) Date: Jan. 14, 2022

(87) PCT Pub. No.: WO2021/011770
PCT Pub. Date: Jan. 21, 2021

(65) Prior Publication Data
US 2022/0264804 A1     Aug. 25, 2022

Related U.S. Application Data

(60) Provisional application No. 62/874,843, filed on Jul. 16, 2019.

(51) Int. Cl.
*A01F 15/08* (2006.01)
*A01F 15/07* (2006.01)

(52) U.S. Cl.
CPC .......... *A01F 15/08* (2013.01); *A01F 15/0715* (2013.01)

(58) Field of Classification Search
CPC .... A01F 15/08; A01F 15/0715; A01F 15/071; A01F 29/005; B65B 11/16; B65B 11/02;
(Continued)

(56) References Cited

U.S. PATENT DOCUMENTS 1,193,506 A    8/1916   Brown
3,674,139 A    7/1972   Manasian et al.
(Continued)

FOREIGN PATENT DOCUMENTS

CN     1251557       4/2000
CN     205812863    12/2016
(Continued)

OTHER PUBLICATIONS

CN Application No. 202080058360.0 Office Action dated Nov. 25, 2022 with translation, 16 pgs.
(Continued)

*Primary Examiner* — Sameh Tawfik
(74) *Attorney, Agent, or Firm* — Peter K. Zacharias; Rebecca L. Henkel; Rickard K. DeMille (57) ABSTRACT

A wrapping system of an agricultural baling system includes a wrap directing system configured to direct a wrapping material to cover an entire periphery of a bale of crop material, such that a first portion of the wrapping material overlaps a second portion of the wrapping material. The wrapping system further includes a fastening system configured to secure the first portion of the wrapping material to the second portion of the wrapping material and a sewing system configured to sew the first portion and the second portion to one another.

4 Claims, 7 Drawing Sheets

(58) Field of Classification Search
CPC ....... B65B 11/025; B65B 11/04; B65B 11/10; B65B 11/22
USPC ........................................................ 53/588
See application file for complete search history.

(56) References Cited

U.S. PATENT DOCUMENTS

| | | | |
|---|---|---|---|
| 3,994,116 A * | 11/1976 | McCormick | B65B 9/026 53/228 |
| 4,194,652 A * | 3/1980 | Williamson | B65D 88/1612 112/475.08 |
| 4,224,970 A * | 9/1980 | Williamson | B65D 88/1612 112/419 |
| 4,228,638 A | 10/1980 | Rabe et al. | |
| 4,324,176 A * | 4/1982 | McCormick | B65B 27/12 100/80 |
| 4,617,784 A * | 10/1986 | Golicz | B65B 27/08 53/553 |
| 5,129,211 A * | 7/1992 | Andersson | B65D 71/08 53/399 |
| 5,182,162 A * | 1/1993 | Andrusko | B32B 5/26 428/95 |
| 5,215,006 A | 6/1993 | Jennings et al. | |
| 5,543,196 A * | 8/1996 | Robinson | A01K 1/007 160/390 |
| 7,165,491 B2 | 1/2007 | Viaud | |
| 8,776,678 B2 | 7/2014 | Roberge | |
| 9,623,989 B2 * | 4/2017 | Loevenich | B65B 5/06 |
| 10,683,113 B2 * | 6/2020 | Mackie | B65B 11/008 |
| 11,267,595 B2 * | 3/2022 | Wetsch | B32B 27/065 |
| 11,406,063 B2 * | 8/2022 | Wigdahl | A01F 15/0841 |
| 2004/0250705 A1 | 12/2004 | Underhill | |
| 2009/0223197 A1 | 9/2009 | Kohlbeck | |
| 2010/0290887 A1 * | 11/2010 | Beale | B66C 1/226 414/815 |
| 2012/0210690 A1 | 8/2012 | Gladin, Jr. et al. | |
| 2014/0196617 A1 | 7/2014 | Lacey | |
| 2015/0373916 A1 * | 12/2015 | Roberge | A01F 15/0705 56/341 |
| 2016/0023788 A1 | 1/2016 | Bruck et al. | |
| 2016/0177135 A1 | 6/2016 | Allen | |
| 2016/0353665 A1 * | 12/2016 | Hummel | A01F 15/071 |
| 2019/0308801 A1 * | 10/2019 | Marias Albrich | B65D 29/04 |
| 2022/0248609 A1 * | 8/2022 | Roberge | A01F 15/18 |

FOREIGN PATENT DOCUMENTS

| | | |
|---|---|---|
| EP | 2689653 | 1/2014 |
| JP | 2000226008 | 8/2000 |

OTHER PUBLICATIONS

CN Application No. 202080058360.0 Office Action dated Aug. 25, 2023 with translation, 15 pgs.

International Search Report and Written Opinion for PCT Application No. PCT/US2020/042327 dated Jul. 16, 2020 (15 pages).

* cited by examiner

SEWING SYSTEM TO SECURE WRAP MATERIAL FOR AGRICULTURAL BALING SYSTEM

BACKGROUND

The present disclosure relates generally to an agricultural baling system configured to wrap a completed bale of crop material.

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be understood that these statements are to be read in this light, and not as admissions of prior art.

An agricultural baling system (e.g., a round baling system, a square baling system) may be used to consolidate and package crop material. In some cases, the agricultural baling system cuts crop material from crops of an agricultural field. The agricultural baling system may have a mechanism that collects the cut crop material and directs the crop material toward a bale forming chamber. Within the baling chamber, the agricultural baling system packages and compacts the bale into a desirable shape. The agricultural baling system may then deposit the bale in the agricultural field for later collection. For example, certain embodiments of agricultural baling systems may include a rear gate, which may be automatically or manually opened to enable a formed bale to move down a ramp onto the ground. In some circumstances, a shape of the deposited bale may change after being deposited in the agricultural field. That is, the deposited bale may expand or otherwise deform after being formed in the bale forming chamber. As a result, the crop material within the bale may be difficult to collect during a subsequent collection operation.

BRIEF DESCRIPTION

In certain embodiments, a wrapping system of an agricultural baling system includes a wrap directing system configured to direct a wrapping material to cover an entire periphery of a bale of crop material, such that a first portion of the wrapping material overlaps a second portion of the wrapping material. The wrapping system further includes a fastening system configured to secure the first portion of the wrapping material to the second portion of the wrapping material and a sewing system configured to sew the first portion and the second portion to one another.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to an agricultural baling system. The agricultural baling system is configured to gather crop material (e.g., cotton) from an agricultural field, compact the crop material into a bale, and deposit the bale in the agricultural field. By forming the crop material into the bale, the agricultural baling system enables the crop material to be collected more easily at a different time, such as during a subsequent collection operation.

In some embodiments, the agricultural baling system may compact and package the crop material into a bale of a particular size and/or shape. For example, the agricultural baling system may form a rectangular, circular, or square shaped bale. However, the shape of the bale may change after the bale is deposited in the agricultural field and before the bale is collected. For instance, a weight of the crop material, an impact of the bale with the ground, and/or other forces imparted onto the bale may cause the bale to deform. In some circumstances, such forces may also cause the bale to lose some crop material, reducing an amount of crop material that is gathered when the bale is collected.

Thus, it is presently recognized that holding the bale together may maintain the shape of the bale and/or the amount of crop material in the bale. In the embodiments disclosed herein, the baling system may include a wrapping system configured to enclose the bale with wrapping material, thereby holding the bale together. The wrapping system may use a flexible wrapping material to wrap the bale, such that the flexible wrapping material conforms to a shape of the bale formed in the bale forming chamber. The baling system may further include a sewing system that secures the flexible material together after the wrapping system has wrapped the flexible wrapping material around the bale. For example, the wrapping system may loop the flexible wrapping material around the bale and create overlapping portions (e.g., folds) of flexible wrapping material. The sewing system may then sew the overlapping portions of flexible material together, thereby securing the flexible material onto the bale to reduce a distortion of the shape of the bale and maintain the shape and quantity of the crop material in the bale.

Figure 1:
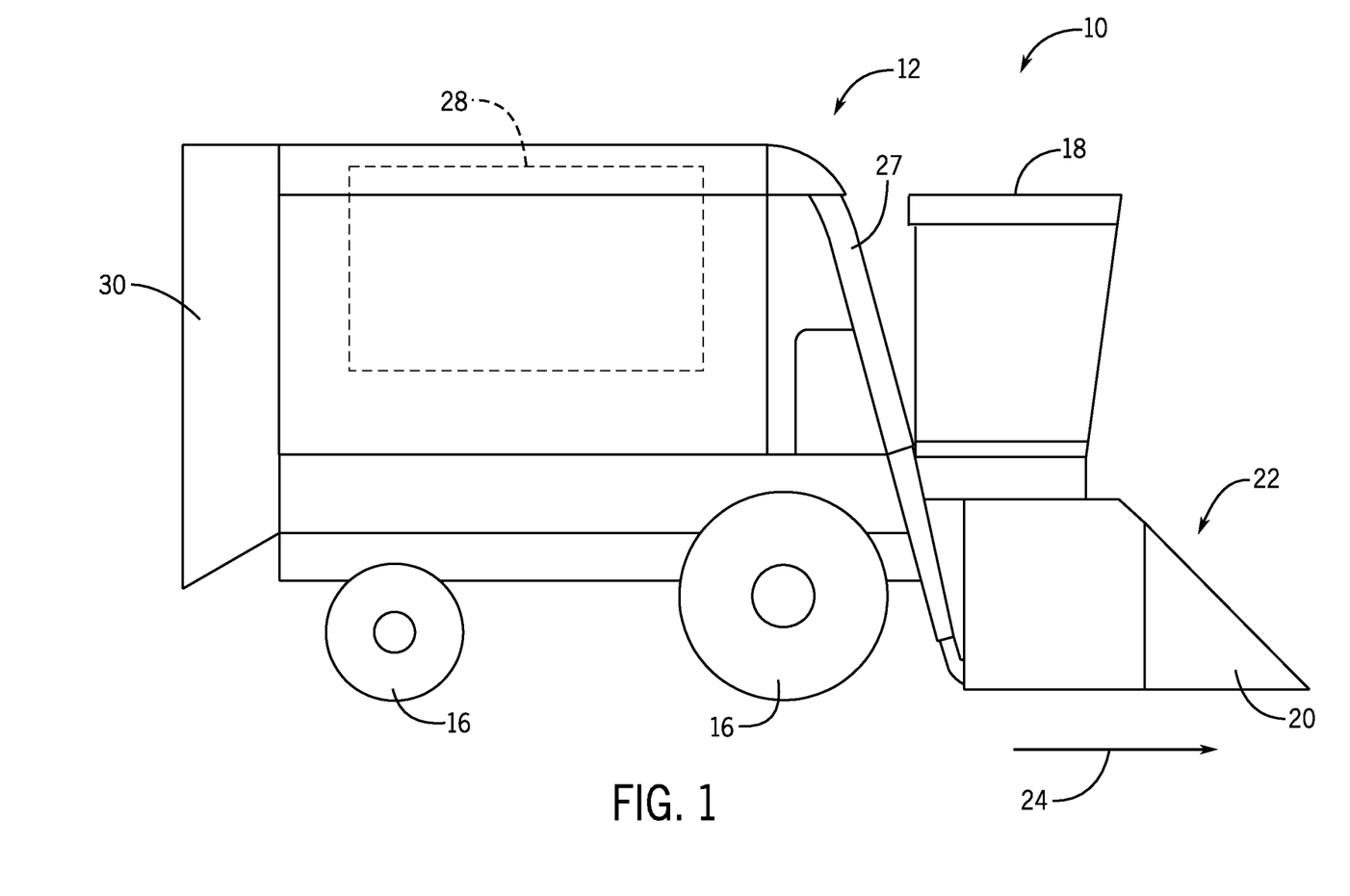
FIG. 1 is a side view of an embodiment of an agricultural material harvester having an agricultural baling system, in accordance with an aspect of the present disclosure.

FIG. 1 is a side view of an embodiment of an agricultural material harvester 10 having an agricultural baling system 12. In the illustrated embodiment, the agricultural material harvester 10 includes wheels 16 that enable the agricultural material harvester 10 to move across an agricultural field and drive movement of the agricultural baling system 12. The agricultural material harvester 10 has a cab 18 in which an operator may be located. The operator may drive the agricultural material harvester via controls within the cab 18 to move the agricultural material harvester across the agricultural field. Additionally or alternatively, the agricultural material harvester may be automatically (e.g., autonomously) controlled and operated. The agricultural material harvester 10 includes a crop collector 20 (e.g., header) mounted on a front end 22 of the agricultural material harvester 10. As the agricultural material harvester drives in a first direction 24, the crop collector 20 may cut crops and gather crop material, such as cotton, from the cut crops. For example, the crop collector 20 may have multiple rotating drums that are configured to cut crops on the agricultural field and to gather residue from the crop material. In some embodiments, the agricultural material harvester 10 includes a conveying system 27 (e.g., an air assisted conveying system) that directs the crop material (e.g., harvested cotton) from the crop collector 20 to the agricultural baling system 12 (e.g., into a baling chamber). In additional or alternative embodiments, the agricultural material harvester may include another suitable system to transport the crop material from the crop collector 20 to the agricultural baling system 12. With the agricultural baling system 12, the crop material is compacted and formed into a bale 28.

In some embodiments, the agricultural baling system 12 includes a rear gate 30 configured to release the bale 28 from the agricultural baling system 12. The rear gate 30 is configured to move between a closed and an open position (e.g., via a hydraulic system, a pulley system, an electromechanical system). In the closed position, the rear gate 30 may close the agricultural baling system 12 to block movement of the bale 28 from the agricultural baling system 12. In an open position, the rear gate 30 may expose the bale to an ambient environment, thereby enabling the bale 28 to be ejected from the agricultural baling system 12. Additionally, the agricultural baling system 12 may also be tilted, thereby urging the bale 28 to translate toward the opened rear gate 30. The rear gate 30 may also act as a ramp while in the open position to direct the bale 28 toward the surface of the agricultural field as the bale 28 is ejected. In other words, the rear gate 30 may contact the surface of the agricultural field to enable the bale 28 to translate (e.g., slide) along the rear gate 30 and be deposited onto the agricultural field.

Although the illustrated agricultural material harvester 10 is self-propelled, in additional or alternative embodiments, the agricultural harvester may be towed by a work vehicle, such as a tractor. For example, the tractor may tow the agricultural baling system and guide the baler through the agricultural field to gather crop material. To this end, the baler and the tractor may be removably coupled to one another, such as via a hitch assembly. Furthermore, the agricultural baling system may alternatively collect crop material on a field instead of harvesting the crop material from the crops. In other words, the crop material may have been previously cut and left in an agricultural field. In a subsequent operation, the agricultural baling system may be operated to collect the crop material.

Figure 2:
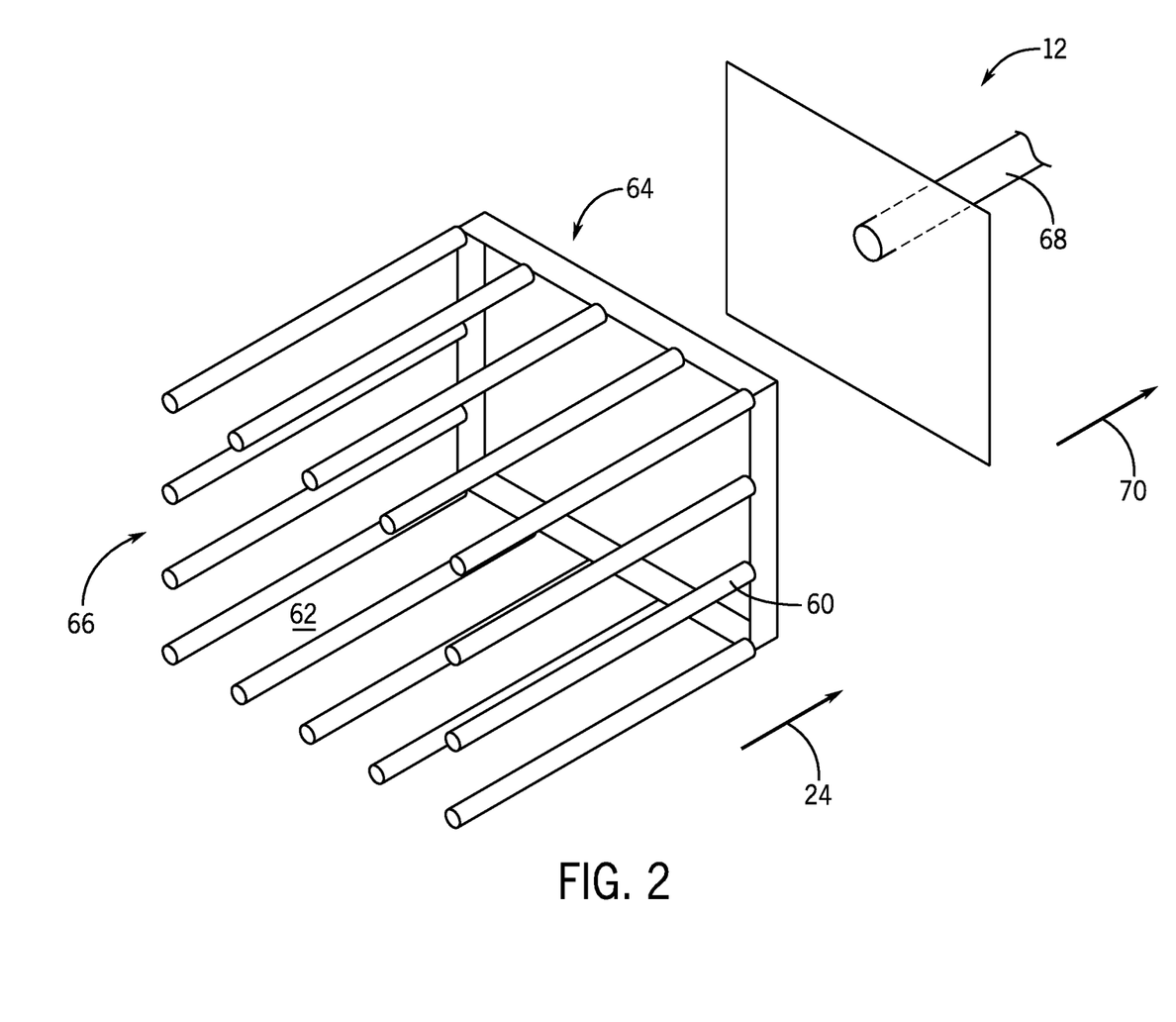
FIG. 2 is a perspective view of an embodiment of the agricultural baling system that may be employed within the agricultural material harvester of FIG. 1 and that may be configured to form bales of crop material into a generally rectangular shape, in accordance with an aspect of the present disclosure.

FIG. 2 is a perspective view of an embodiment of the agricultural baling system 12 that may be employed by the agricultural baler 10 and that may be configured to form bales of crop material into a generally rectangular shape. Thus, the illustrated agricultural baling system 12 may be considered a rectangular baler. In the illustrated embodiment, the agricultural baling system 12 includes a frame 60 defining a baling chamber 62. The baling chamber 62 has a forward end 64 (e.g., a first end) and a rear end 66 (e.g., a second end), generally relative to the direction of travel 24 of the agricultural baler 10. For example, the forward end 64 may be proximal to the crop collector, while the rear end 66 may be distal from the crop collector. In the agricultural baling system 12, the crop material is compressed within the baling chamber 62 by a plunger 68. The plunger 68 is configured to move axially within the baling chamber 62 in a reciprocating motion along a longitudinal axis 70. By way of example, the plunger 68 is coupled to an actuator, which may include a hydraulic actuator, a pneumatic actuator, an electromechanical actuator, or any combination thereof, to drive the plunger 68 to move along the longitudinal axis 70. The crop material may flow into the baling chamber 62 through the forward end 64, and the plunger 68 may move along the longitudinal axis 70 from the forward end 64 toward the rear end 66 to compress the crop material within the baling chamber 62, thereby compressing the crop material toward or against the rear end 66. As a result, the plunger 68 compresses the crop material into a generally rectangular shape enclosed by the baling chamber 62. In some embodiments, the rear end 66 may also include a stationary wall, although in other embodiments the rear end may include a rear plunger configured to move along the longitudinal axis as well, so as to provide a means to control the size and/or density of the bale. Although the illustrated agricultural baling system 12 slightly compresses the crop material along the longitudinal axis 70, alternative embodiments of the baler may compress the crop material along a different axis, such as a lateral axis and/or a vertical axis.

Figure 3:
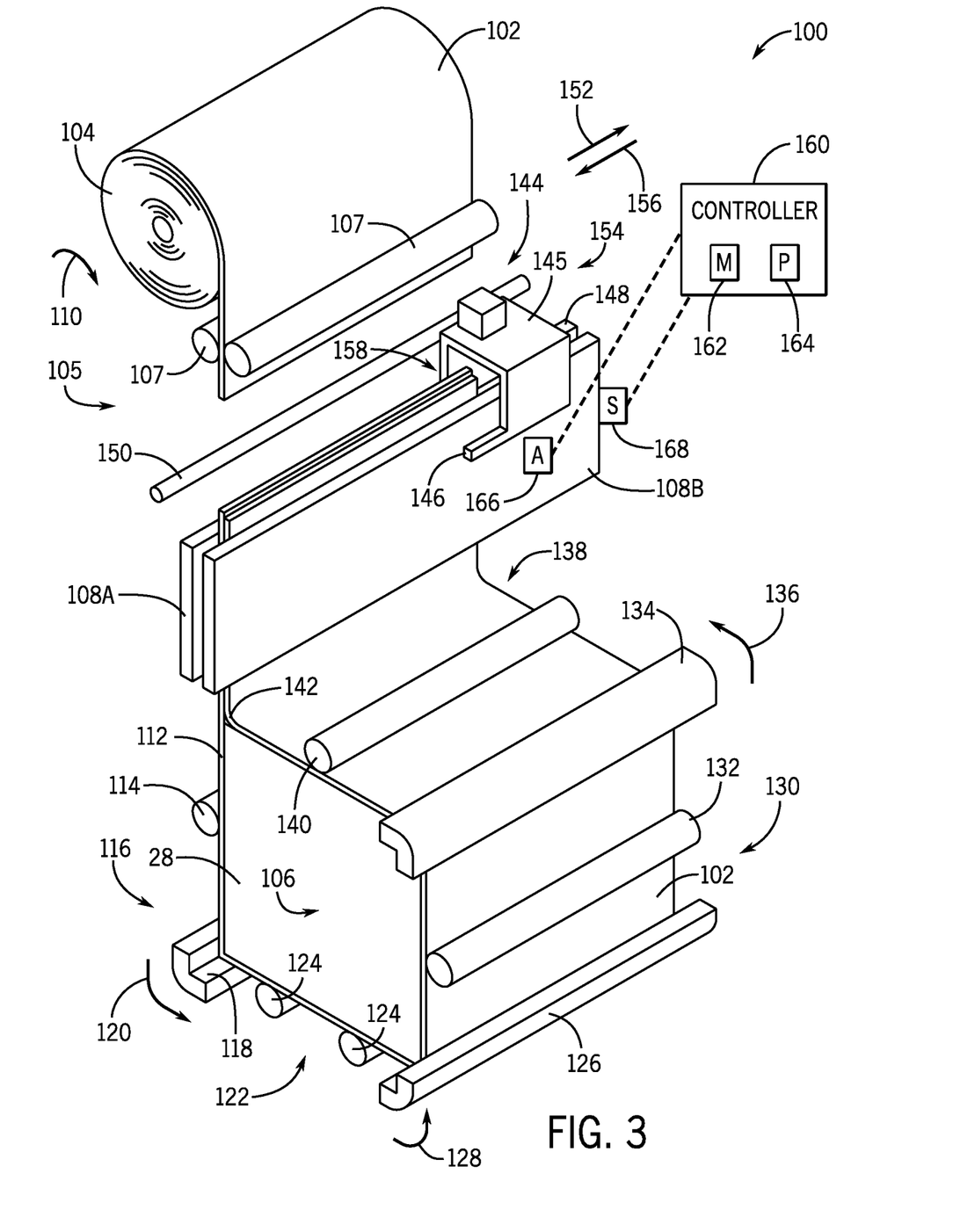
FIG. 3 is a perspective view of an embodiment of a wrapping system that may be employed within the agricultural baling system of FIG. 1 to wrap a bale with a wrapping material, in accordance with an aspect of the present disclosure.

As described above, it may be desirable to hold a bale together after the bale has been formed (e.g., in the baling chamber). FIG. 3 is a perspective view of an embodiment of a wrapping system 100 (e.g., a wrap management system) that may be employing within the agricultural baling system of FIG. 1 to wrap the bale 28 with a wrapping material 102. The wrapping material 102 may be formed from a natural and/or bio-degradable material, such as cotton, so as to reduce an amount of waste created when performing baling operations. Although the illustrated wrapping system 100 wraps a rectangular bale 28, in additional or alternative embodiments, the wrapping system 100 may wrap a cylindrical, square, or any other suitably shaped bale 28. As shown in FIG. 3, the wrapping material 102 is stored within a reel 104 of wrapping material 102. Furthermore, a wrap directing system 105 of the wrapping system 100 may be configured to direct the wrapping material 102 to cover an entire periphery of the bale 28. For example, the bale 28 may be supported at lateral sides 106, and the wrap directing system 105 directs the wrapping material to surround remaining sides of the bale 28. Additionally or alternatively, the bale 28 may be supported by a support structure, the wrap directing system 105 may direct the wrapping material to cover the support structure and the bale, and then the support structure may be removed, resulting in the wrap material to cover just the bale and not the support structure.

The wrap directing system 105 may include first guide rollers 107 configured to direct the wrapping material 102 from the reel 104 to a clamp having a pair of jaws 108A, 108B, which may be supported by a housing of the wrapping system 100. For example, in certain embodiments, at least one of the guide rollers 107 is driven to rotate, thereby moving the wrapping material 102 toward the pair of claims 108A, 108B. Rotation of the reel 104 (e.g., in a first rotational direction 110) may supply the wrapping material 102 to wrap the bale 28. The wrapping material 102 may move from the first guide rollers 107 of a wrap directing system 105 through the jaws 108 of the clamp to second guide rollers 114 of the wrap directing system 105. The second guide rollers 114 may direct the wrapping material 102 toward a first deflector 118 of the wrap directing system 105 to cover a first side 116 of the bale 28. The first deflector 118 may then direct the wrapping material 102 in a first direction 120 toward a second side 122 of the bale 28. At the second side 122, third guide rollers 124 of the wrap directing system 105 may direct the wrapping material 102 toward a second deflector 126 of the wrap directing system 105 to cover the second side 122 of the bale 28. The second deflector 126 may then direct the wrapping material 102 in a second direction 128 toward a third side 130 of the bale 28. At the third side 130, fourth guide rollers 132 of the wrap directing system 105 may direct the wrapping material 102 toward a third deflector 134 of the wrap directing system 105 to cover the third side 130 of the bale 28. The third deflector 134 may then direct the wrapping material 102 in a third direction 136 toward a fourth side 138 of the bale 28. Fifth guide rollers 140 of the wrap directing system 105 may then direct the wrapping material 102 to cover the fourth side 138 of the bale 28. The wrapping material 102 may then be directed through the jaws 108 (e.g., via one or more additional guide rollers).

Accordingly, two overlapping portions of the wrapping material 102 (e.g., a first overlapping portion or fold 112 and a second overlapping portion or fold 142) may extend between the jaws 108. In this way, the wrapping system 100 loops the wrapping material 102 around the bale 28, and the first overlapping portion 112 and second overlapping portion 142 of the wrapping material 102 overlap between the jaws 108. In additional or alternative embodiments, the wrap directing system may include other features, such as tracks, actuators, translating rollers, and so forth, to guide the wrapping material to cover the entire periphery of the bale.

Although the wrapping system 100 directs the wrapping material 102 around the bale 28 to wrap the bale 28 with the wrapping material 102, in additional or alternative embodiments, the wrapping system may wrap the bale in another manner. For example, wrapping material may be prepositioned in the wrapping system into shape that includes a cavity (e.g., a hollow rectangular shape) and an opening leading into the cavity. Crop material may then be fed into the cavity via the opening to fill the cavity. After the cavity is filled with the crop material, the folds of the wrapping paper (e.g., at the opening) may then be compressed together via the jaws, thereby wrapping the entire periphery of the bale in the wrapping material.

In the illustrated embodiment, the wrapping system 100 includes a sewing system 144 configured to sew the first overlapping portion 112 and the second overlapping portion 142 of the wrapping material 102 together, thereby forming a wrap around the bale 28 that substantially maintains the bale 28 in the desired shape and significantly reduces loss of harvested agricultural material from the bale 28. The sewing system 144 may include a sewing device 145 (e.g., a sewing machine) having a pair of arms 146 that straddle the jaws 108, such that the sewing device has a substantially U-shape. Because first and second overlapping portions 112, 142 are disposed between the arms 146 of the sewing device 145, the sewing system 144 may be considered a two-sided sewing system 144 (e.g., as compared to a one-sided sewing system described below). The arms 146 are configured to impart a force that compresses the jaws 108A, 108B toward one another, thereby compressing the first overlapping portion 112 and the second overlapping portion 142 within the jaws 108. For example, each arm 146 may include a roller that abuts one of the jaws 108 to push the jaws 108 toward one another. Therefore, the jaws 108A, 108B may be a part of a fastening system that holds and substantially maintains the positions of the first overlapping portion 112 and the second overlapping portion 142 between the jaws 108A, 108B as the sewing device 145 sews the wrapping material 102, thereby enabling the sewing device 145 to sew the first overlapping portion 112 with the second overlapping portion 142 to one another.

In the illustrated embodiment, the sewing device 145 travels along the jaws 108 to sew the first overlapping portion 112 to the second overlapping portion 142. To this end, the sewing device 145 includes a cutter 148 mounted to the sewing device 145 and configured to cut the wrapping material 102 extending from the first guide rollers 107 to the jaws 108, so as to remove wrapping material 102 that would otherwise block movement of the sewing device 145 along the jaws 108.

For example, the sewing system 144 may include a guide 150 along which the sewing system 145 may translate (e.g., slide). In some embodiments, after the wrapping system 100 has wrapped the bale 28 with the wrapping material 102, the sewing device 145 may move along the guide 150 in a first sewing direction 152, and the sewing device 145 may sew the first overlapping portion 112 to the second overlapping portion 142 while traveling in the first sewing direction 152. To this end, the cutter 148 may be positioned at a first end 154 (e.g., a leading end) of the sewing device 145, such that the cutter 148 cuts wrapping material 102 as the sewing device 145 travels along the first sewing direction 152. As a result, the bale 28 is wrapped by a single continuous sheet of wrapping material 102 that covers an entire periphery of the bale 28. After the sewing device 145 has sewn the first overlapping portion 112 to the second overlapping portion 142, the sewing device 145 may then travel along the guide 150 in a second sewing direction 156, opposite the first sewing direction 152, to reset the position of the sewing device 145 before the bale 28 is ejected from the baling chamber and additional wrapping material 102 is directed through the jaws 108 (e.g., to wrap another bale). In other words, after the wrapping system 100 has wrapped the bale 28 with the wrapping material 102, the sewing device 145 travels from a starting position along the first sewing direction 152 to cut the wrapping material 102 and to sew the first overlapping portion 112 to the second overlapping portion 142. After the sewing device 145 has sewn the wrapping material 102, the sewing device 145 may then travel along the second sewing direction 156 to return to the starting position. The sewing device 145 may remain in the starting position until the wrapping system 100 wraps another bale 28 with additional wrapping material 102. The sewing device 145 may then travel in the first sewing direction 152 again to cut and sew the additional wrapping material 102 together. In alternative embodiments, the sewing system may not include the guide and, rather, the sewing device may travel linearly along the jaws via rollers, a track (e.g., grooves) disposed or formed on the jaws, and/or any other suitable feature to guide the sewing device along the jaws.

In additional or alternative embodiments, the sewing system may also be configured to sew the first overlapping portion to the second overlapping portion while traveling in the second sewing direction. To this end, the sewing system may include an additional cutter disposed at a second end 158 of the sewing system to cut the wrapping material extending from the first guide rollers to the jaws, so as to remove wrapping material blocking the sewing system from traveling along the second sewing direction. As such, the sewing system may not reset to the starting position before sewing the wrapping material of a subsequent bale. Accordingly, the sewing device may move in alternating directions to sew the wrapping material disposed around consecutively formed bales.

In further embodiments, the sewing system may be configured to sew the wrapping material together after the wrap directing system has directed the wrapping material around the bale multiple times. For instance, the wrap directing system may direct the wrapping material around the bale a first time to create the first and second overlapping portions within the jaws, and then the wrap directing system may direct the wrapping material around the bale a second time to create third and fourth overlapping portions within the jaws, and so forth to create any suitable number of overlapping portions. The sewing system may then sew the overlapping portions together.

In certain embodiments, the sewing system 144 is communicatively coupled with a controller 160. The controller 160 has a memory 162 and a processor 164 configured to execute software code or instructions stored on the memory 162. As an example, the memory 162 may store processor-executable software code or instructions (e.g., firmware or software), which are tangibly stored on a tangible computer readable medium. Such instructions may be related to how the sewing device 145 sews the first overlapping portion 112 to the second overlapping portion 142. Additionally or alternatively, the memory may store data. As an example, the memory 162 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, the processor 164 may include multiple microprocessors, one or more "general-purpose" microprocessors, one or more special-purpose microprocessors, and/or one or more application specific integrated circuits (ASICS), or some combination thereof. For example, the processor 58 may include one or more reduced instruction set (RISC) or complex instruction set (CISC) processors.

For instance, the controller 160 may be configured to output a control signal to an actuator 166 configured to drive the sewing device 145 in the first sewing direction 152 and in the second sewing direction 156. In certain embodiments, the controller 160 is communicatively coupled with a sensor 168, which may be configured to output a sensor signal indicative of the second overlapping portion 142 being present between the jaws 108A, 108B. In response to receiving the sensor signal, the controller 160 may determine that the bale 28 has been wrapped with the wrapping material 102, such that the wrapping material 102 is in condition for the sewing device 145 to sew the first overlapping portion 112 to the second overlapping portion 142. In additional or alternative embodiments, the controller may be configured to output the control signal at particular time intervals (e.g., associated with a time at which the wrapping system has wrapped the bale with the wrapping material). In further embodiments, the controller may be configured to control the wrapping system. For instance, the controller may actuate the reel to move wrapping material through the wrapping system when the wrapping system receives a newly formed bale and suspending actuation of the reel to restrict movement of the wrapping material when the second overlapping portion is between the jaws.

Figure 4:
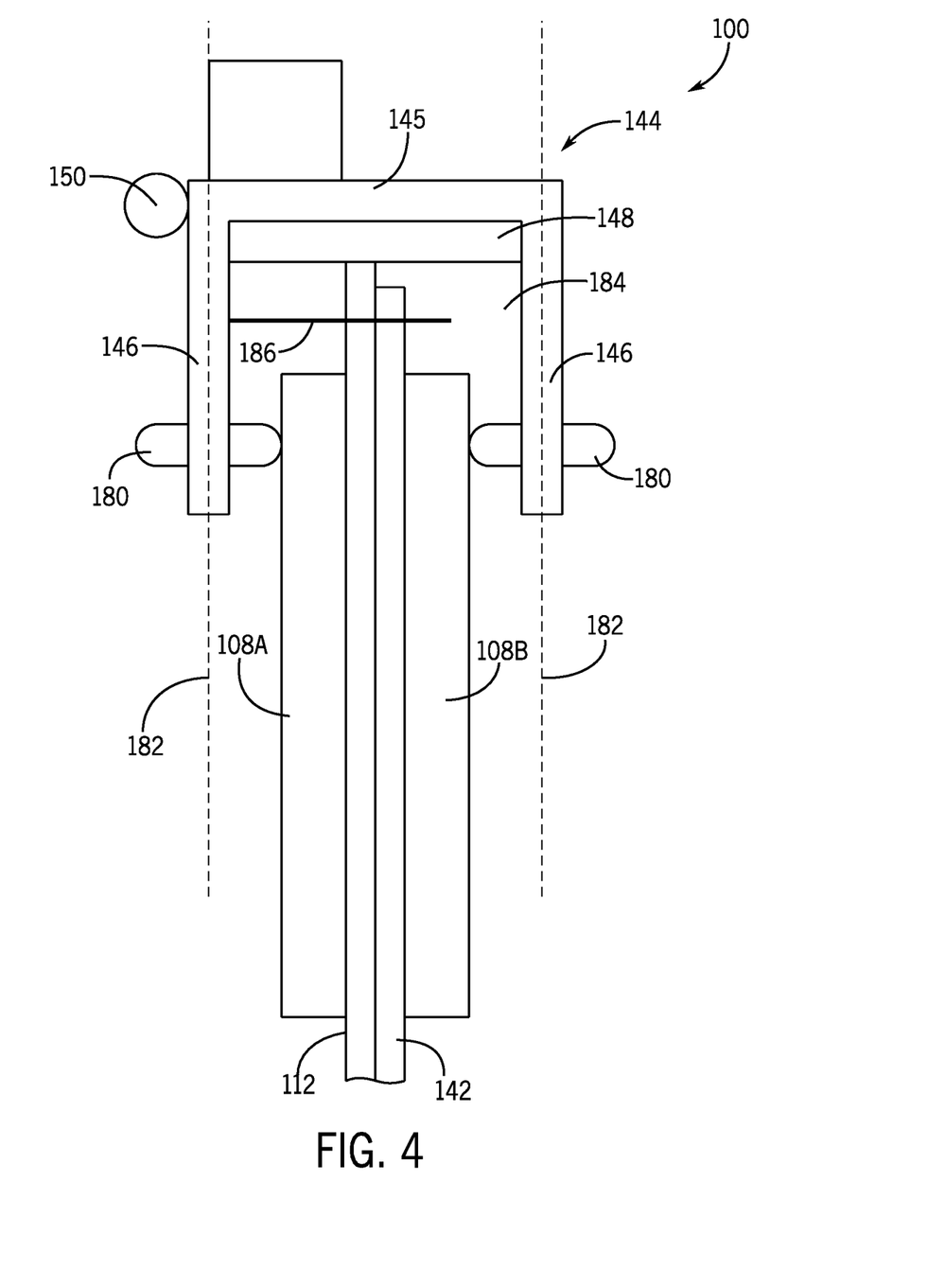
FIG. 4 is a partial side view of the wrapping system of FIG. 3 that includes a sewing system, in accordance with an aspect of the present disclosure.

FIG. 4 is a partial side view of the wrapping system 100 of FIG. 3 that includes the sewing system 144. In the illustrated embodiment, the sewing device 145 includes wheels 180 coupled to the arms 146. Each wheel 180 is configured to engage a respective jaw 108 of the clamp, thereby imparting the force that compresses the jaws 108 and holds the first overlapping portion 112 and the second overlapping portion 142 within the jaws 108. Additionally, each wheel 180 is configured to rotate about a respective rotational axis 182. Rotation of the wheels 180 along the jaws 108 enables the sewing device 145 to move in the first sewing direction and the second sewing direction along the guide 150 and the jaws 108. The first overlapping portion 112 and the second overlapping portion 142 each extend through the jaws 108 into a sewing space 184. Within the sewing space 184, a needle 186 of the sewing device 145 directs threading through the first overlapping portion 112 and the second overlapping portion 142. As the sewing device 145 travels along the first sewing direction, and in certain embodiments the second sewing direction, the cutter 148 may cut the first overlapping portion 112 and the second overlapping portion 142, and the needle 186 may repeatedly extend through the first overlapping portion 112 and the second overlapping portion 142 to sew the first overlapping portion 112 to the second overlapping portion 142. In certain embodiments, at least one of the wheels 180 may be driven to rotate the sewing device 145 along the guide 150 and the jaws 108. In alternative embodiments, the guide may drive the sewing device along the jaws. In further embodiments, the sewing device 145 may also include a feature to hold the first overlapping portion 112 and the second overlapping portion to sew the overlapping portions 112, 142 together. For example, the sewing device 145 may include a grip adjacent to the cutter 148 to hold the overlapping portions 112, 142 in place, a surface adjacent one of the arms 146 to support the overlapping portions 112, 142 as the needle 186 extends through the overlapping portions 112, 142, and the like.

Figure 5:
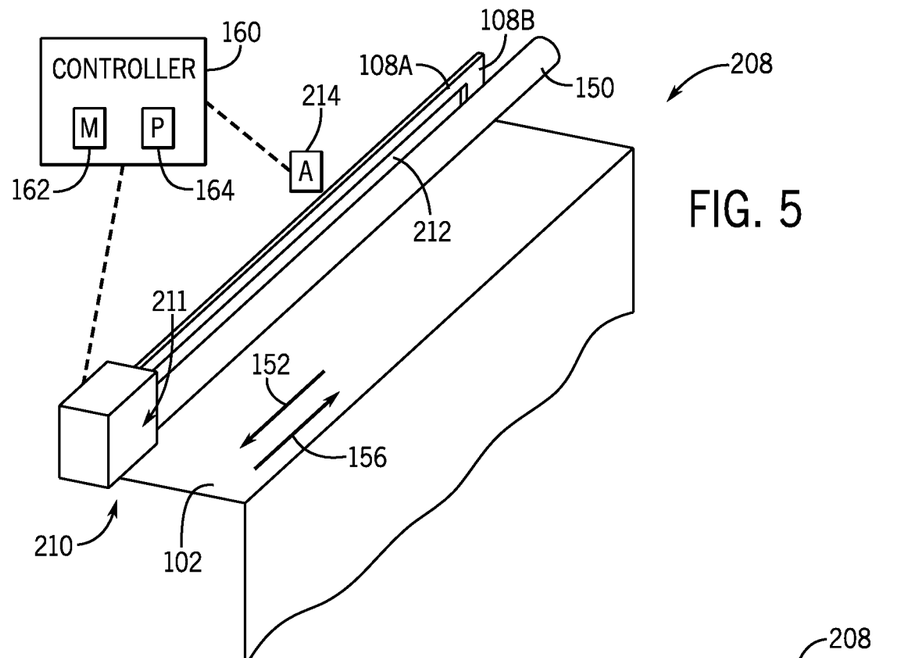
FIG. 5 is a perspective view of another embodiment of a wrapping system having a one-sided sewing system, in accordance with an aspect of the present disclosure.

FIG. 5 is a perspective view of another embodiment of a wrapping system 208 having a one-sided sewing system 210 that further includes a sewing device 211. In the illustrated embodiment, the sewing device 211 does not have arms that straddle and abut both jaws 108 of the clamp. Rather, the sewing device 211 is positioned proximate to (e.g., in contact with) one of the jaws 108 to sew the wrapping material 102. Furthermore, the jaws 108A, 108B each include an opening 212 providing the sewing device 211 with access to the overlapping portions 112, 142 of the wrapping material between the jaws 108. The sewing device 211 may have two needles that extend through the openings 212 to sew the overlapping portions 112, 142 together. In addition, the wrapping system 208 may include a clamp actuator 214 configured to drive the jaws 108A, 108B toward one another, thereby clamping the wrapping material 102 within the jaws 108. By way of example, the controller 160 may output a signal to activate the actuator 214, thereby securing the wrapping material 102 within the jaws 108 to enable the sewing device 211 to sew the wrapping material 102 together. Further, in the illustrated embodiment, the guide 150 is disposed adjacent to one of the jaws 108. The guide 150 enables the sewing device 211 to travel along the jaws 108 to sew the overlapping portions 112, 142 of the wrapping material 102 together. In an example embodiment, the sewing device 211 may be configured to sew the overlapping portions 112, 142 of the wrapping material 102 together while traveling along the first sewing direction 152. Additionally or alternatively, the sewing device may sew the overlapping portions of the wrapping material together while traveling along the second sewing direction 156. In certain implementations, the sewing device 211 may include a cutter to cut the wrapping material 102, such that a single sheet of wrapping material 102 covers the bale 28. In additional or alternative embodiments, the sewing system may include a separate cutter configured to cut the wrapping material.

Figure 6:
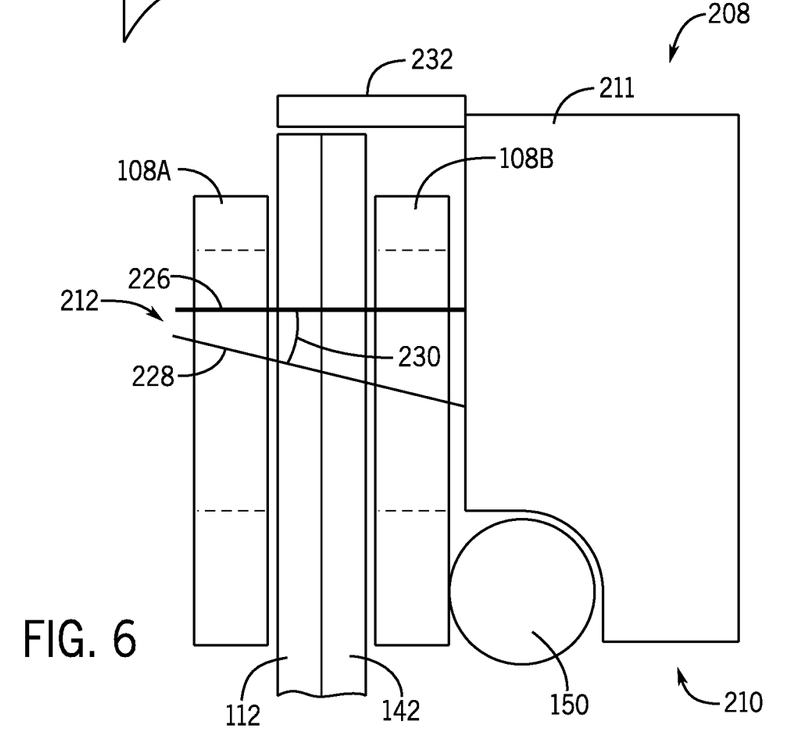
FIG. 6 is a partial side view of the wrapping system of FIG. 5, in accordance with an aspect of the present disclosure.

FIG. 6 is a partial side view of the wrapping system 208 of FIG. 5. The sewing device 211 includes needles 226, 228 configured to repeatedly extend through each of the openings 212 of the jaws 108A, 108B and through the first overlapping portion 112 and the second overlapping portion 142 of the wrapping material, thereby sewing the first overlapping portion 112 to the second overlapping portion 142 as the sewing device 211 travels along the guide 150. The needles 226, 228 may be at an angle 230 relative to one another, and the sewing device 211 may coordinate the movement of each needle 226, 228 to sew the overlapping portions 112, 142 together. For instance, each needle 226 may include thread, and the sewing device 211 may move the needles 226, 228 to intertwine the respective threads together, thereby sewing the first overlapping portion with the second overlapping portion. In the illustrated embodiment, the sewing device 211 also includes a cutter 232 configured to cut the first overlapping portion 112 and the second overlapping portion 142 of the wrapping material as the sewing device 211 travels along the jaws 108.

Figure 7:
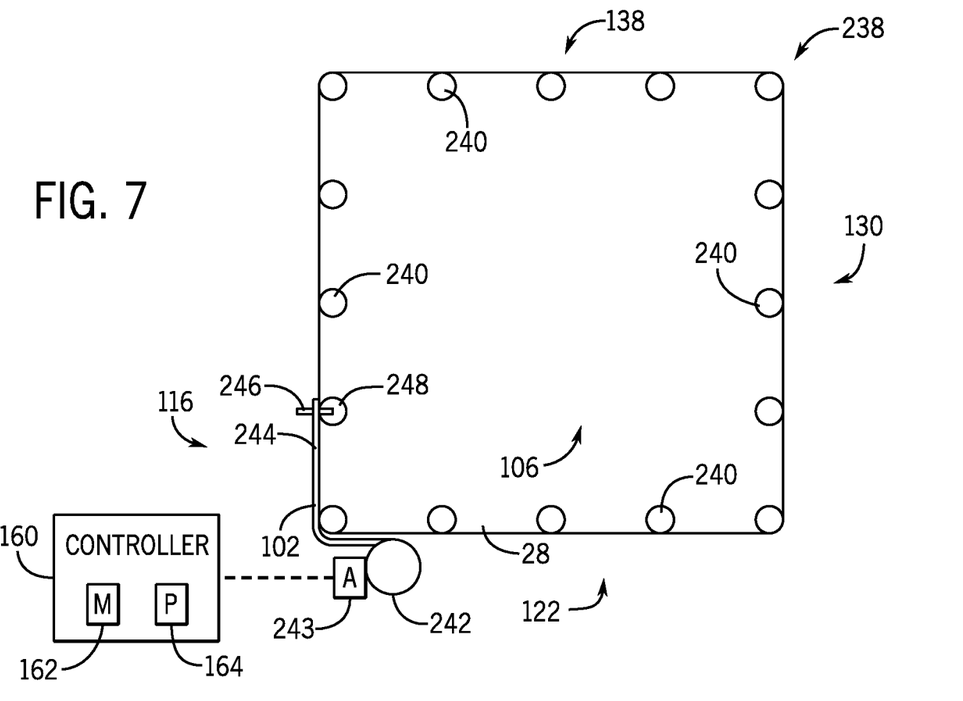
FIG. 7 is a schematic side view of another embodiment of a wrapping system configured to wrap a bale with wrapping material, in accordance with an aspect of the present disclosure.

FIG. 7 is a schematic side view of another embodiment of the wrapping system 238 configured to wrap the bale 28, which is illustrated as a square bale, with wrapping material 102. In the illustrated embodiment, tubes 240 (e.g., pipes) are embedded within the bale 28 to maintain a shape of the formed bale 28. As an example, the tubes 240 may be disposed within the baling chamber (e.g., coupled to the frame of the baling chamber) and, as the crop material is compressed within the baling chamber, the crop material at least partially engulfs the tubes 240 and causes the tubes 240 to decouple from the frame such that the tubes 240 remain inserted within the bale 28. The wrapping system 238 includes a wrapping roller 242, which may be a wrap directing system configured to move around the bale 28 to wrap the bale 28. For example, the wrapping roller 242 may include an amount of the wrapping material 102 (e.g., wound around a spool or a coil), and the wrapping system 238 may include a track or a guide along which the wrapping roller 242 may travel to move around the bale 28. In one embodiment, the bale 28 is supported at lateral sides 106 as the wrapping roller 242 travels around remaining sides of the bale 28 to cover the bale 28 with the wrapping material 102. In an additional or an alternative embodiment, the bale is supported with a supporting structure, and the wrapping roller travels around the supporting structure and the bale to cover both the bale and the supporting structure with the wrapping material. After the wrapping roller has covered both the bale and the supporting structure with the wrapping material, the supporting structure may be removed from the bale or the bale may be moved away from the supporting structure such that the wrapping material covers just the bale.

A wrapping roller actuator 243 may be communicatively coupled to the controller 160 and configured to move the wrapping roller 242 around the bale 28 in response to control signal(s) from the controller 160. As the wrapping roller 242 moves around the bale 28, the wrapping roller 242 expels the wrapping material 102 from within the wrapping roller 242 onto the bale 28, thereby wrapping the bale 28 with the wrapping material 102. In the illustrated embodiment, the wrapping roller 242 initially begins at a starting or home location 244 at the first side 116 of the bale 28. The wrapping roller 242 then move along the first side 116 of the bale 28 to the second side 122, to the third side 130, to the fourth side 138, and then back to the first side 116 to loop around the bale 28, thereby covering each side 116, 122, 130, 138 of the bale 28 with the wrapping material 102.

The wrapping material 102 may be secured or perforated to the bale 28 via one or more pins 246 (e.g., nail(s), bolt(s), etc.) of a fastening system that fixes a first end of the wrapping material 102 to the bale 28 while the wrapping roller 242 travels around the bale 28. For example, the sewing system may push the pins 246 through the wrapping material 102. Additionally or alternatively, a separate component may push the pins through the wrapping material. In some embodiments, a perforated tube 248 is embedded within the bale 28 that enables the pin(s) 246 to be securely inserted through the bale 28. For instance, the perforated tube 248 may include multiple openings configured to receive respective the pins 246 that puncture the wrapping material 102, thereby securing the wrapping material 102 to the bale 28 proximate to the starting location 244. In certain embodiments, the wrapping system 238 may include an additional device (e.g., a nailer) configured to output the pins 246 into the perforated tube 248. For instance, the wrapping roller 242 may expel some wrapping material 102 at the starting location 244, and the additional device may output the pins 246 through the wrapping material 102 and the perforated tube 248 to couple the wrapping material 102 to the perforated tube 248 the bale 28. In additional or alternative embodiments, the additional device may output the pins 246 through the wrapping material 102 and onto the bale 28, thereby directly coupling the wrapping material 102 to the bale 28.

Figure 8:
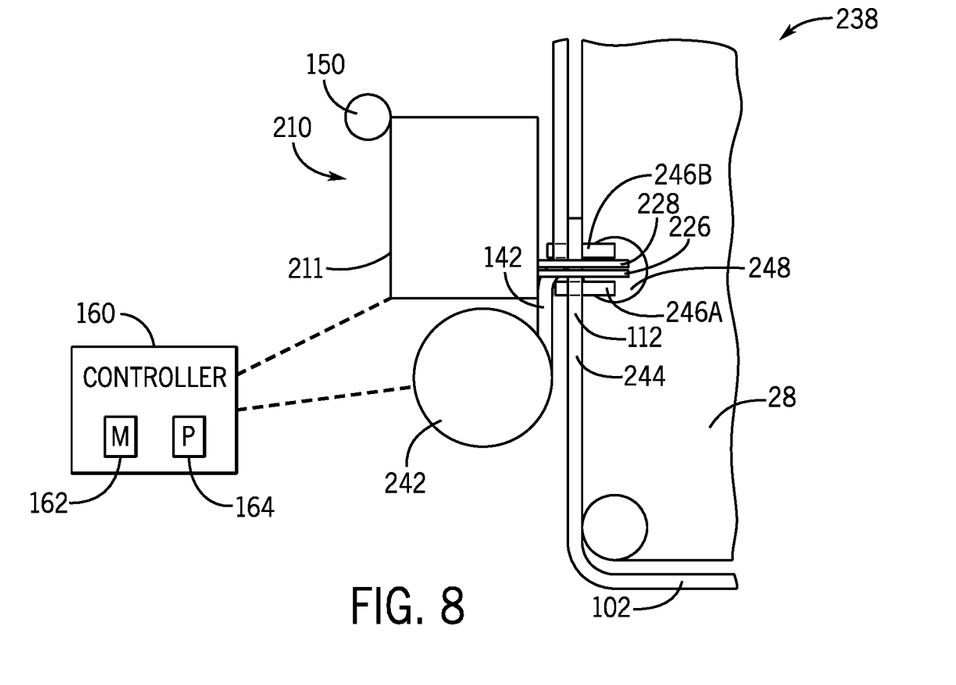
FIG. 8 is a partial schematic side view of the wrapping system of FIG. 7 after a wrapping roller has covered the bale with the wrapping material, in accordance with an aspect of the present disclosure.

FIG. 8 is a partial schematic side view of the wrapping system 238 of FIG. 7 after the wrapping roller 242 has covered the bale 28 with the wrapping material 102. In the illustrated embodiment, the wrapping roller 242 has returned to the starting location 244 such that the first overlapping portion 112 of the wrapping material 102 overlaps with the second overlapping portion 142 of the wrapping material 102. Furthermore, in addition to the pin(s) 246A, additional pins 246B may be inserted (e.g., by the additional device) through the second overlapping portion 142 into the perforated tube 248 to couple the second overlapping portion 142 with the bale 28, thereby at least temporarily fastening the second overlapping portion 142 to the first overlapping portion 112 of the wrapping material 102. After the second overlapping portion 142 is pinned to the first overlapping portion 112, the controller 160 may output the control signal to the one-sided sewing device 211 to cause the sewing device 211 to sew the first overlapping portion 112 to the second overlapping portion 142. The sewing device 211 may then travel along the perforated tube 248 (e.g., along the guide 150) to sew the first overlapping portion 112 to with the second overlapping portion 142, such as by repeatedly inserting the needles 226, 228 through the first overlapping portion 112 and the second overlapping portion 142 and into the perforated tube 248, thereby coupling the first overlapping portion 112 and the second overlapping portion 142 together. The needles of the sewing device 211 may be inserted between the pins 246A, 246B so as to avoid contacting the pins 246, which may affect an operation of sewing the overlapping portions 112, 142 to one another. After the overlapping portions 112, 142 are sewn together, the pins 246 may be removed from the perforated tube 248 and the wrapping material 102. By way of example, the wrapping system 238 may include another device (e.g., a nail puller) configured to remove the pins 246 automatically after the sewing device 211 has sewn the overlapping portions 112, 142 to one another. In additional or alternative embodiments, the pins may remain inserted through the wrapping material and the perforated tube after the sewing device 211 has sewn the overlapping portions 112, 142 to one another. In further embodiments, an actuator inside the perforated tube may eject the pins and/or the sewn overlapping portions to decouple the pins and the wrapping material from the bale.

In certain embodiments, the sewing device 211 may also include a cutter configured to cut the wrapping material 102, thereby separating the wrapping material 102 from the wrapping roller 242 and forming a wrapped bale 28. In alternative embodiments, the sewing system may include a cutter that is separate from the sewing device and is configured to cut the wrapping material. Accordingly, a single sheet of wrapping material 102 covers the bale 28, thereby enabling the covered bale 28 to be removed from the wrapping system 238 (e.g., for deposition onto the agricultural field).

Although FIGS. 3-8 are described with reference to covering an entire periphery of a stationary (e.g., non-rotating) rectangular or square bale with wrapping material, any of the embodiments described above may be applied to cover an entire periphery of a round bale with wrapping material. As an example, a stationary (e.g., non-rotating) bale of any suitable shape may be covered with the wrapping material such that overlapping portions are formed, and the sewing system may sew the overlapping portions together to secure the wrapping material onto the bale.

Figure 9:
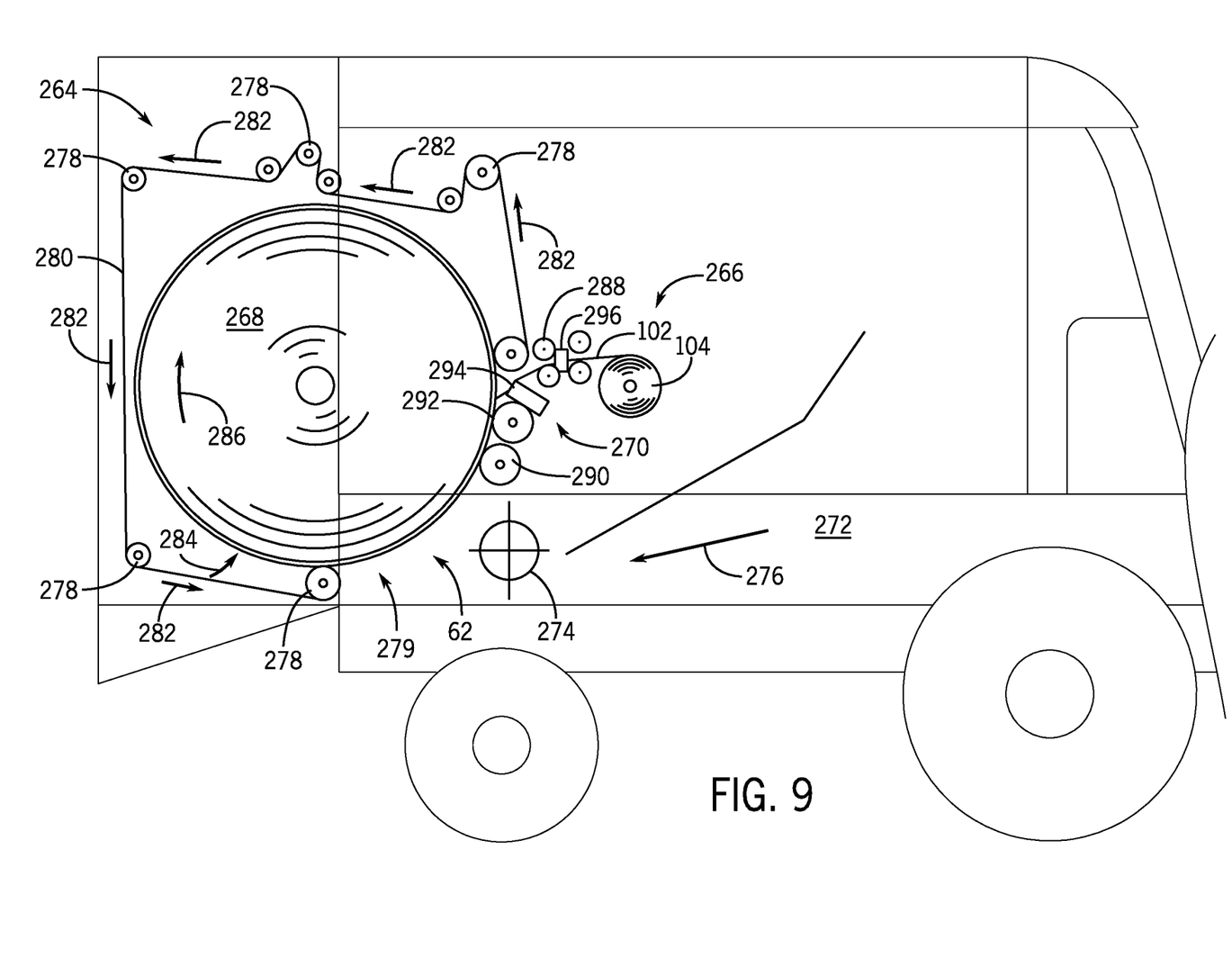
FIG. 9 is a side section view of another embodiment of an agricultural baling system having a wrapping system configured to wrap a round bale of crop material, in which the wrapping system has a sewing system, in accordance with an aspect of the present disclosure.

FIG. 9 is a side section view of another embodiment of an agricultural baling system 264 having a wrapping system 266 configured to wrap a round bale 268 of crop material, in which the wrapping system has a sewing system 270. During operation of the agricultural baling system, crop material may gather in an accumulation area 272. A feeder roller 274 of the wrapping system 266 may rotate to direct and drive the crop material from the accumulation area 272 to the baling chamber 62 in a direction 276. Multiple rollers 278 are disposed within the baling chamber 62, and a belt 280 extends round the rollers 278. For example, certain rollers 278 may be driven to rotate to move the belt 280 in a belt rotation direction 282. As crop material is directed into the baling chamber 62, the crop material may contact a section 284 of the belt 282, thereby causing the crop material to rotate within the baling chamber 62 in a rotational direction 286 (e.g., a generally counter-clockwise rotation). Continuous feeding of the crop material into the baling chamber 62 and movement of the crop material in the rotational direction 286 may form the crop material into the cylindrically shaped bale 268.

The wrapping system 266 may include the reel 104 configured to supply the wrapping material 102 for covering the bale 268. For instance, the reel 104 of wrapping material 102 may rotate to provide the wrapping material 102 to a first guide roller 288, which guide the wrapping material 102 to a second guide roller 290 proximate a first location 292 of the bale 268. Moreover, rotation of the crop material in the rotational direction 286 may further guide the wrapping material 102 circumferentially around the bale 268, such that the wrapping material 102 returns to the first location 292 after circumscribing the bale 268. For example, the agricultural baling system 264 stops the bale 268 from rotating in the rotational direction 286 (e.g., via a braking system, via electric motor(s), etc.) to enable the sewing system 270 of the wrapping system 266 to sew the overlapped portions together. After the bale 268 is substantially stopped, the wrapping system 266 (e.g., the belt 280) may drive the bale 268 through one additional rotation to extend the wrapping material 102 around the bale 268, so as to enable parts of the wrapping material 102 to overlap with one another at the first location 292, such as collected within jaws adjacent the first location 292.

A sewing device 294 of the wrapping system 266 may then sew the overlapped portions together. For example, the sewing device 294 may be a two-sided sewing system configured to translate along the jaws and sew overlapping portions of the wrapping material 102 while traveling along the jaws. Additionally or alternatively, the jaws may include openings, and the sewing device 294 may be a one-sided sewing system having two needles configured to sew overlapping portions of the wrapping material 102 through the openings.

Additionally or alternatively, the sewing system may be configured to sew the overlapped portions together while the bale is still rotating in the baling chamber. For instance, the wrapping material may be cut while the bale is still rotating, and the clamp and the sewing device may be configure to removably couple to the bale that is rotating. As the bale is rotating, the jaws of the clamp may hold overlapping portions of the wrapping material, and the sewing device may sew together the overlapping portions. After the overlapping portions have been sewn, the clamp and the sewing device may decouple from the bale.

Although the sewing device 294 is disposed adjacent to the first location 292 in the illustrated embodiment, the sewing device 294 may be disposed in another suitable location, such as adjacent to the feeder roller 274, adjacent to one of the rollers 278, at a bottom portion 279 of the wrapping system 264, adjacent the section 284 of the belt 280, and the like. In some embodiments, the wrapping system 266 may include a cutter 296 that is separate from the sewing device 294 to cut the wrapping material 102 and separate the wrapping material 102 covering the bale 268 from the wrap 104, thereby forming a single sheet of wrapping material 102 covering an entire periphery of the bale 268. In additional or alternative embodiments, the sewing device 294 may include the cutter configured to cut the wrapping material 102 (e.g., adjacent to the first location 292). After the sewing device 294 has sewn the wrapping material 102 together and the cutter 296 has cut the wrapping material 102, the bale 268 may be ejected from the baling chamber 62. In such embodiments, the wrapping system 266 may further include a component to clean debris within the agricultural baling system 264 after the bale 268 is ejected from the baling chamber 62.

While the embodiments disclosed above utilize a sewing system to secure the wrapping material around the bale, in certain embodiments, another suitable type of coupling system (e.g., instead of the sewing system or in addition to the sewing system) may be utilized to secure a first portion of the wrapping material to a second portion of the wrapping material, thereby securing the wrapping material around the bale. For example, in certain embodiments, the wrapping system may include an adhesive application system configured to apply an adhesive to a first portion of the wrapping material. As the wrapping material is wrapped around the bale, the first portion of the wrapping material may overlap a second portion of the wrapping material, such that the adhesive on the first portion contacts the second portion. As a result, an adhesive connection between the portions is established, thereby securing the wrapping material around the bale. Furthermore, in certain embodiments, an adhesive material may be embedded within and/or on a first portion of the wrapping material. The embedded adhesive material may be activated (e.g., by removing a coating layer, by applying an activating agent, by applying heat, etc.), and the adhesive material within/on the first portion of the wrapping material may contact a second portion of the wrapping material as the wrapping material is wrapped around the bale. As a result, an adhesive connection between the portions is established, thereby securing the wrapping material around the bale.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A wrapping system of an agricultural baling system, comprising:
    a wrap directing system configured to direct a wrapping material to cover an entire periphery of a bale of crop material within a baling chamber of the agricultural baling system, such that a first portion of the wrapping material overlaps a second portion of the wrapping material;
    a fastening system configured to secure the first portion of the wrapping material to the second portion of the wrapping material, wherein the fastening system comprises a clamp configured to compress the first portion and the second portion against one another via a pair of jaws, and each jaw of the pair of jaws has an opening provides access to the first portion and the second portion; and
    a sewing system having a sewing device configured to sew the first portion and the second portion to one another, wherein the sewing system is a one-sided sewing system, and the sewing device is configured to sew the first portion to the second portion through the opening in each jaw of the pair of jaws.

2. The wrapping system of claim 1, wherein the sewing system comprises a cutter configured to cut the wrapping material.

3. The wrapping system of claim 1, wherein the sewing system comprises a guide, wherein the sewing device is configured to travel along the guide to sew the first portion and the second portion to one another.

4. The wrapping system of claim 1, comprising a controller configured to output a control signal to activate the sewing system to sew the first portion and the second portion to one another.

* * * * *